United States Patent
Li et al.

(10) Patent No.: US 12,395,751 B2
(45) Date of Patent: Aug. 19, 2025

(54) AUXILIARY FOCUSING METHOD, APPARATUS, AND SYSTEM FOR GENERATING AUXILIARY FOCUS IMAGE BASED ON DEPTH INFORMATION

(71) Applicant: SZ DJI TECHNOLOGY CO., LTD., Shenzhen (CN)

(72) Inventors: Kai Li, Shenzhen (CN); Fangming Ye, Shenzhen (CN); Ce Xiong, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 153 days.

(21) Appl. No.: 18/210,110

(22) Filed: Jun. 15, 2023

(65) Prior Publication Data

US 2023/0328400 A1   Oct. 12, 2023

Related U.S. Application Data

(63) Continuation of application No. PCT/CN2020/136829, filed on Dec. 16, 2020.

(51) Int. Cl.
*H04N 23/958* (2023.01)
*H04N 23/62* (2023.01)
(Continued)

(52) U.S. Cl.
CPC .......... *H04N 23/958* (2023.01); *H04N 23/62* (2023.01); *H04N 23/633* (2023.01); *H04N 23/67* (2023.01)

(58) Field of Classification Search
CPC .... H04N 23/958; H04N 23/62; H04N 23/633; H04N 23/67; H04N 23/671
See application file for complete search history.

(56) References Cited

U.S. PATENT DOCUMENTS

| | | | | |
|---|---|---|---|---|
| 2014/0267869 A1* | 9/2014 | Sawa | ............ | H04N 23/66 |
| | | | | 348/333.03 |
| 2017/0295316 A1* | 10/2017 | Ito | ............ | H04N 23/635 |

(Continued)

FOREIGN PATENT DOCUMENTS

| CN | 102348058 A | 2/2012 |
|---|---|---|
| CN | 104052925 A | 9/2014 |

(Continued)

OTHER PUBLICATIONS

Office Action issued Nov. 8, 2023 in Chinese Patent Application No. 202080077437.9, 3 pages.

(Continued)

*Primary Examiner* — Gevell V Selby
(74) *Attorney, Agent, or Firm* — ANOVA LAW GROUP, PLLC

(57) ABSTRACT

An auxiliary focusing method, device and system. When a user uses an image capturer to photograph a target scene, an auxiliary focus image can be generated based on depth information of objects in the target scene, and the auxiliary focus image can visually display the depth distribution of the objects in the target scene and a corresponding position of a focus point of the image capturer in the target scene, so that the user can intuitively understand the current position of the focus point from the auxiliary focus image and adjust the position of the focus point according to the depth distribution of the objects, so that an object of interest to the user can be clearly imaged.

20 Claims, 9 Drawing Sheets

(51) Int. Cl.
*H04N 23/63* (2023.01)
*H04N 23/67* (2023.01)

(56) References Cited

U.S. PATENT DOCUMENTS

| | | | |
|---|---|---|---|
| 2018/0249092 A1 | 8/2018 | Kuriyama et al. | |
| 2018/0278837 A1* | 9/2018 | Lee | H04N 23/741 |
| 2019/0246034 A1* | 8/2019 | Watanabe | H04N 23/64 |

FOREIGN PATENT DOCUMENTS

| | | |
|---|---|---|
| CN | 105474622 A | 4/2016 |
| CN | 106060358 A | 10/2016 |
| CN | 106134176 A | 11/2016 |
| CN | 106226975 A | 12/2016 |
| JP | 2008-256826 A | 10/2008 |

OTHER PUBLICATIONS

International Search Report and Written Opinion mailed on Sep. 15, 2021, received for PCT Application PCT/CN2020/136829, filed on Dec. 16, 2020, 9 pages including English Translation.

* cited by examiner

AUXILIARY FOCUSING METHOD, APPARATUS, AND SYSTEM FOR GENERATING AUXILIARY FOCUS IMAGE BASED ON DEPTH INFORMATION

CROSS-REFERENCE TO RELATED APPLICATION

The present application is a continuation of International Application No. PCT/CN2020/136829, filed Dec. 16, 2020, the entire contents of which being incorporated herein by reference in its entirety.

TECHNICAL FIELD

The present application relates to the field of image capture technology, and more specifically to a method, apparatus and system for auxiliary focusing.

BACKGROUND

In some shooting scenarios, usage of autofocus to focus a photographing device is less than ideal, so a user needs to focus the photographing device by way of manual focusing. In the manual focusing, the user needs adjust a position of a focus ring according to a distance between the target object and the photographing device in order to adjust the position of the focus point so that the focus point is aligned with the plane where the target object that the user wants to shoot is located. As such, the target object can form clear image in the photographing device. In order to facilitate the user to adjust the position of the focus point, it is necessary to provide a program to assist the user to focus manually.

SUMMARY

In view of this, the present application provides an auxiliary focusing method, apparatus and system.

According to a first aspect of the present application, there is provided an auxiliary focusing method, said method comprising.
under a condition that an image capturer photographs a target scene, generating an auxiliary focus image based on depth information of objects in the target scene, wherein the auxiliary focus image displays depth distribution of the objects and a current position of a focus point of the image capturer in the target scene;
displaying the auxiliary focus image to a user via an interactive interface;
receiving adjustment of the current position of the focus point by the user to obtain an adjusted position of the focus point; and
updating the auxiliary focus image based on the adjusted position of the focus point.

According to a second aspect of the present application, there is provided an auxiliary focusing device, said auxiliary focusing device comprising a processor, a memory, a computer program stored on said memory for execution by said processor, said processor executing said computer program realizing the steps of
under a condition that an image capturer photographs a target scene, generating an auxiliary focus image based on depth information of objects in the target scene, wherein the auxiliary focus image displays depth distribution of the objects and a current position of a focus point of the image capturer in the target scene;
displaying the auxiliary focus image to a user via an interactive interface;
receiving adjustment of the current position of the focus point by the user to obtain an adjusted position of the focus point; and
updating the auxiliary focus image based on the adjusted position of the focus point.

According to a third aspect of the present application, there is provided an auxiliary focusing system, said system comprising an auxiliary focusing device, a photographing device and a distance measuring device as mentioned in the second aspect above.

By applying some embodiment of this application, when the user uses the image capturer or photographing device to shoot the target scene, the auxiliary focus image can be generated according to the depth information of each object in the target scene. The user can intuitively understand the location of the current focus point from the auxiliary focus image, and adjust the position of the focus point according to the depth distribution of each object, so that the object of interest to the user can be clearly imaged, and the auxiliary focus image provides a reference for the user to manually focus, which facilitates the user to manually focus and improves the efficiency of the user to manually focus.

It should be understood that the above general description and the following detailed description are only exemplary and explanatory and are not restrictive of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1:
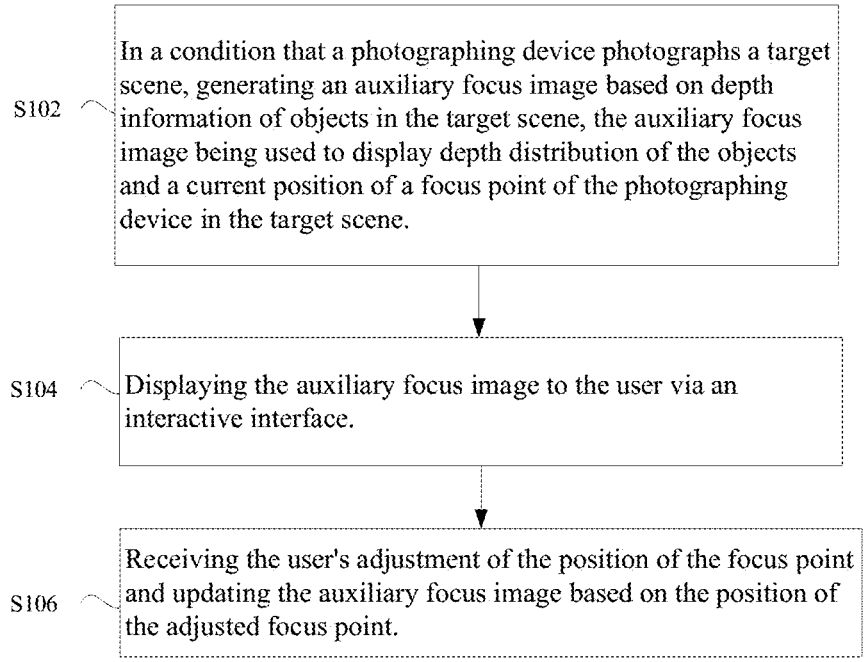
FIG. 1 is a flow chart of an auxiliary focusing method of an embodiment of the present application.

The technical solutions in the embodiments of the present application will be described below in conjunction with the accompanying drawings in the embodiments of the present application. Obviously, the described embodiments are only some of the embodiments of the present application, not all of them. Based on the embodiments in this application, all other embodiments obtained by persons of ordinary skill in the art without making creative efforts belong to the scope of protection of this application.

Before using the photographing device to capture images, it is necessary to focus the photographing device so that the focus point of the photographing device is on the plane where the target object that the user wants to shoot is located, so as to ensure that the target object in the captured image is clear. A lens of the photographing device is generally composed of a plurality of groups of lenses. By adjusting a distance between one or more lens groups and the imaging plane (ie photosensitive element), the position of the focal point can be adjusted. Among them, the lens group used to change the focus position is called the focus lens group. By adjusting the position of the focus lens group, the focus position can be changed by, for example, moving the focus point forward or backward so that it can be aimed at the target object. Generally, the photographing device can include a focus ring, and the focus ring generally includes a scale, which can indicate the corresponding position of the focus ring when the distance between the target object and the photographing device is different. The position of the focus lens group can be adjusted by adjusting the position of the focus ring, thereby changing the position of the focus point.

Currently, there are two types of focusing methods, autofocus and manual focus. Autofocus can be determined by the photographing device itself to determine the location of the focus point and automatically drive the focus ring to adjust to the corresponding position, without the need for manual adjustment by the user. However, in scenes such as low light, low contrast shooting scenes and macro shooting, the effect of using autofocus may be less than ideal, thus requiring the manual focus method.

In manual focusing, a user can adjust the position of the focus ring on the photographing device according to the distance between the target object and the photographing device, so as to change the position of the focus point, so that the object of interest to the user can be clearly imaged. At present, in order to more accurately adjust the position of the focus point, a number of distance measuring devices or distance measurer may be used to measure the distance between each target object and the photographing device in the shooting scene, such as depth sensors, LIDAR, etc. Through these distance measuring devices, the depth image or point cloud of the shooting scene can be obtained. For a depth image, the depth values need to be mapped to pixel valued of the image according to certain rules, which cannot intuitively reflect the depth distribution of each object in the scene. The point cloud needs to be manually dragged to see the distribution of a 3D scene on a 2D screen, which is not easy to operate. Therefore, only through the depth image or point cloud collected by the distance measuring device to show the depth of each object in the shooting scene, the user can not intuitively understand the depth distribution of each object, and it is not convenient for the user to focus manually.

Based on this, one embodiment of the present application provides an auxiliary focusing method wherein, when the user uses the photographing device to shoot the target scene, an auxiliary focus image can be generated based on depth information of each object in the target scene. The auxiliary focus image can visually display the depth distribution of each object in the target scene and a corresponding position of the focus point of the photographing device in the target scene, As such, the user can intuitively understand the current focus position from the auxiliary focus image, and determine how to adjust the focus position according to the depth distribution of each object, so that the object of interest to the user can be clearly imaged.

The auxiliary focusing method of one embodiment of the present application can be performed by a photographing device or other devices communicatively connected to the photographing device. For example, in some scenarios, a special follow focus device can be used to adjust the focus position of the photographing device, and in such scenarios, the method can also be performed by a follow focus device equipped with the photographing device.

In some embodiments, an auxiliary focusing method is shown in FIG. 1 and includes the following steps:

Step S102 includes, in a condition that a photographing device photographs a target scene, generating an auxiliary focus image based on depth information of objects in the target scene, the auxiliary focus image being used to display depth distribution of the objects and a current position of a focus point of the photographing device in the target scene.

In a manual focus mode, the user needs to know the distance between the target object and the photographing device and adjust the position of the focus point according to the distance. Therefore, when the user uses the photographing device to shoot the target scene, the depth information of each object in the target scene can be obtained first. Among them, the depth information of each object in the target scene can be obtained through some distance measuring devices. For example, the photographing device can be equipped with distance measuring devices such as a laser radar, a depth camera, a depth sensor, and an infrared rangefinder, and the depth information of each object in the target scene can be obtained through these distance measuring devices. For example, in some embodiments, the photographing device can be an integrated device that includes a color camera and a depth camera, or a device obtained by combining two cameras.

After obtaining the depth information of each object, the auxiliary focus image can be generated based on the depth information of each object, and the auxiliary focus image can be an image in various forms. For example, the auxiliary focus image can show the depth value of each object, as well as the depth value of the current focus location. The auxiliary focus image can also only display the distance relationship between each object and the photographing device, as long as the image can intuitively show the depth distribution of each object in the target scene and the current focus position of the photographing device in the target scene.

Step S104 includes displaying the auxiliary focus image to the user via an interactive interface.

After generating the auxiliary focus image, the auxiliary focus image can be displayed to the user through an interactive interface, which can be the interactive interface provided by the photographing device in scenarios where the auxiliary focusing method is performed by the photographing device. In a scenario where the auxiliary focusing method is performed by other devices (such as a focus-following device), the interactive interface may be an interactive interface provided by a photographing device or an interactive interface provided by the focus-following device. Of course, in some scenarios, the interactive interface can also be the interactive interface provided by other devices communicatively connected to the photographing device or the follow-focus device, and this is not limited in the present application.

Step S106 includes receiving the user's adjustment of the position of the focus point and updating the auxiliary focus image based on the position of the adjusted focus point.

After seeing the auxiliary focus image displayed in the interactive interface, the user can intuitively see where the current focus point is located. The user can determine the location of the object of his interest according to the depth distribution of each object, and then adjust the position of the focus point according to the location of the object of his interest. After receiving the user's instruction to adjust the focus position, the auxiliary focus image can be updated according to the position of the adjusted focus point, so that the position of the focus point can be displayed in the image in real time to provide a reference for the user to adjust the focus position.

By generating an auxiliary focus image based on the depth information of each object in the target scene and displaying it to the user through the interactive interface, the method of this embodiment uses the auxiliary focus image to display the depth distribution of each object in the target scene and the position of the current focus point in the target scene, so that the user can intuitively know where the current focus is located in the scene based on the auxiliary focus image and how to adjust the focus point to the plane where the object of interest is located. This provides great convenience for the user to focus manually and improves efficiency of manual focusing, thereby enhancing the user experience.

In some embodiments, the auxiliary focus image may show only the depth distribution of each object in the target scene and the position of the focus point. In some embodiments, the auxiliary focus image may also display the scene image of the target scene captured by the photographing device. For example, when generating the auxiliary focus image, the scene image of the target scene captured by the photographing device may be acquired. Then, a depth distribution image may be generated based on the depth information of each object in the target scene, and the depth distribution image may be used to display the depth distribution of each object. Then, the auxiliary focus image may be generated based on the scene image and the depth distribution image.

In some embodiments, the depth distribution of the objects in the target scene may be shown by projection points corresponding to each of the objects in the depth distribution image. For example, the depth distribution image can be obtained by projecting each object in the target scene along a specified axis, each target object can correspond to one or more projection points in the depth distribution image, where the specified axis does not coincide with the optical axis of the photographing device. In this way, the depth information of each object in the target scene can be retained during the projection process to avoid the loss of depth information.

Figure 2:
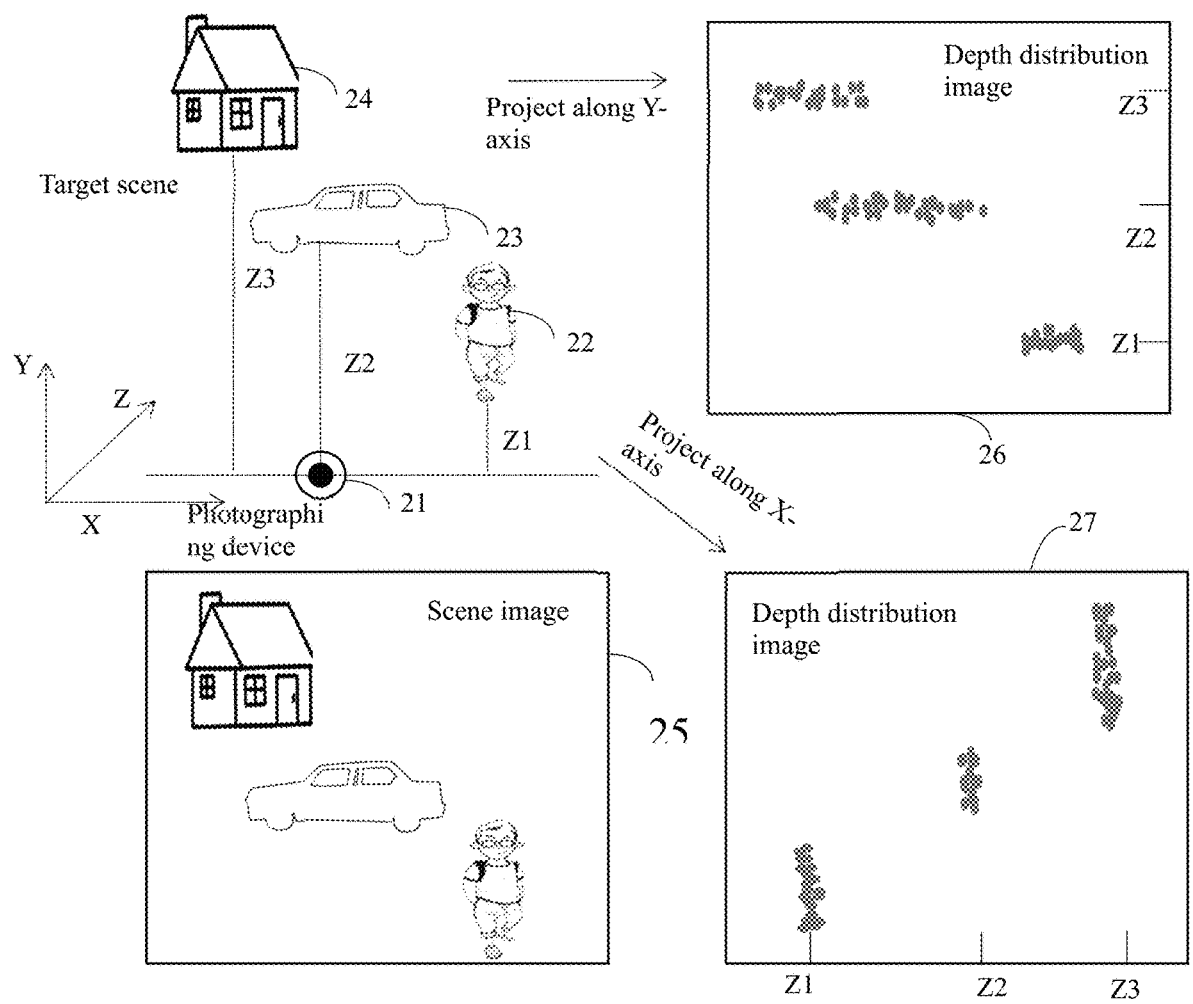
FIG. 2 is a schematic diagram of a depth distribution image of an embodiment of the present application.

For example, as shown in FIG. 2, the target scene includes three objects, which are a pedestrian 22, a vehicle 23 and a house 24. Assuming that the optical axis of the photographing device 21 coincides with the Z-axis, the distance between the above three objects and the photographing device 21 are Z1, Z2 and Z3 respectively. The photographing device 21 performs image acquisition on the target scene to obtain a scene image 25. At the same time, the depth information of the target scene can be obtained through the distance measuring device, such as the three-dimensional point cloud of the target scene obtained through the LIDAR or the depth image of the target scene obtained through the depth camera. Then, the depth distribution image showing the depth distribution of each object obtained by projecting each object in the target scene in a non-Z-axis direction according to the 3D point cloud or depth image is obtained. For example, the objects can be projected in the Y-axis or X-axis direction to obtain a depth distribution image that can show the depth distribution of each object. As in FIG. 2, the depth distribution image 26 is the target scene of the objects along the Y-axis projection. The horizontal axis of the depth distribution image 26 indicates the location distribution of the objects in the X-axis direction, and the vertical axis of the depth distribution image 26 indicates the depth distance between the objects and the photographing device 21. As in FIG. 2, the depth distribution image 27 is the projection of the objects in the target scene along the X-axis direction. The horizontal axis of the depth distribution image 27 indicates the distance between the objects and the photographing device 21, and the vertical axis of the depth distribution image 27 indicates the position distribution of the objects in the Y-axis direction.

In order for the user to have a more intuitive view of the depth distribution of each object in the target scene, in some embodiments, the horizontal or vertical axis of the depth distribution image can be used to show the depth value of the projection point corresponding to each object. For example, the more the projection point is located on the right (or left) side of the horizontal axis of the image, the greater the depth value of the projection point, or the more the projection point is located above (or below) the vertical axis of the image, the smaller the depth value of the projection point.

In some embodiments, in order to facilitate the user to know the specific value of the depth distance between each object and photographing device in the target scene, the horizontal or vertical axis of the depth distribution image can carry a scale, and each scale identifies the corresponding depth value. Through the depth value of each scale, the depth value of the projection point can be determined so as to determine the depth value of each object. Of course, the depth distribution image can also not carry a scale, as long as the direction of the horizontal or vertical axis indicates the direction of increasing depth.

In some embodiments, the scales carried by the horizontal or vertical axis of the depth distribution image may be uniform scales. In some embodiments, the scales carried by the horizontal or vertical axes of the depth distribution image may also be non-uniform scales, for example, marking only the scale and depth value at the depth position corresponding to each object.

In some embodiments, the vertical axis of the depth distribution image may be used to represent the depth value of the projection point, and the horizontal axis of the depth distribution image may represent the location distribution of the object corresponding to the projection point in the three-dimensional space. For example, it may represent whether the object corresponding to the projection point is to the left or to the right (or to the top or to the bottom) of the non-projection axis and non-depth axis in the three-dimensional space. The properties of each projection point in the depth distribution image can be used to characterize the number of spatial 3D points corresponding to each object projected to that projection point. For example, each object in 3D space can be viewed as including many spatial 3D points, and each projection point on the depth image can be obtained by projecting 3D points with different Y-coordinates at a fixed X-coordinate and a fixed depth value, and thus the properties of the projection point can be used to indicate the number of spatial three-dimensional points projected to the projection point.

Figure 3:
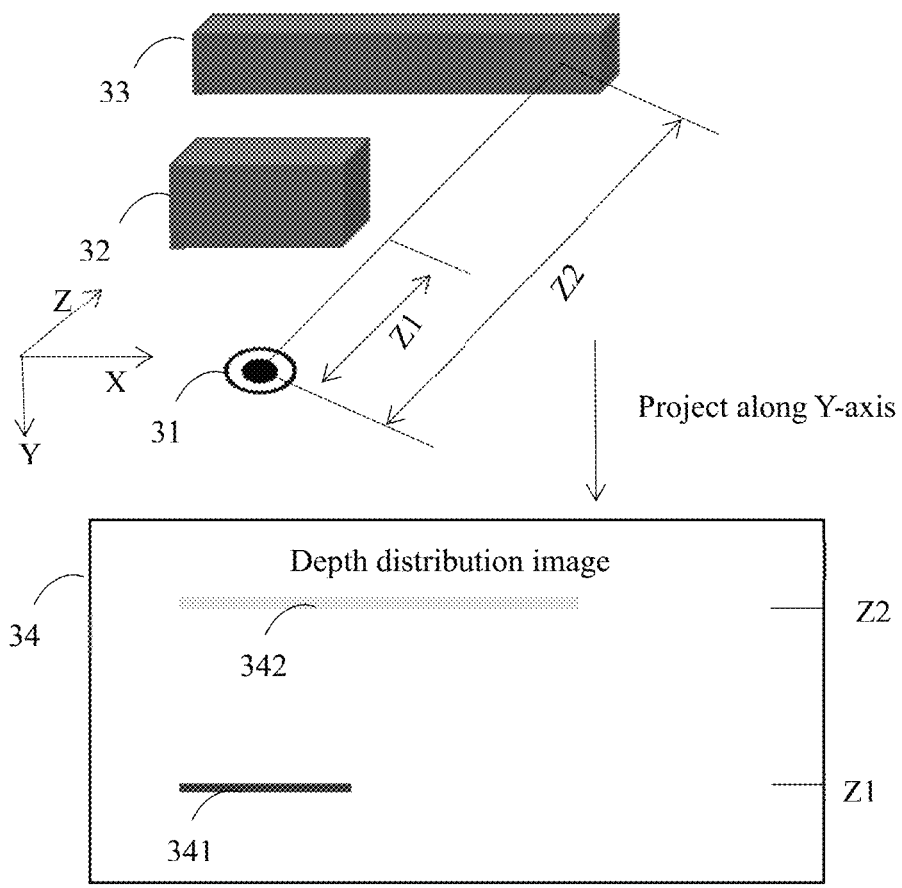
FIG. 3 is a schematic diagram of a depth distribution image of an embodiment of the present application.

In some embodiments, as shown in FIG. 3, there are a small rectangular body 32 and a large rectangular body 33 in the target scene, and the photographing device 31 acquires images of the two objects along the direction of the Z-axis, and the depth distances of the two objects from the photographing device 31 are Z1 and Z2, respectively. The depth distribution image 34 is obtained by projecting the two objects along the direction of the Y-axis. The projection point corresponding to the small rectangular body 32 on the depth distribution image 34 is 341, and the corresponding projection point of the large rectangular body 33 on the depth distribution image 34 is 342, where the vertical axis of the depth distribution image can be used to represent the depth values of the two objects at the corresponding projection points of the depth distribution image. The horizontal axis of the depth distribution image can represent the location distribution of the two objects in the three-dimensional space in the X-axis forward direction. For example, an object located to the left of the X-axis in the three-dimensional space is located to the left of the horizontal axis of the depth distribution image, and an object located to the right of the X-axis of the three-dimensional space is located to the right of the horizontal axis of the depth distribution image.

In some embodiments, the property of the projection point may be any of a grayscale value of the projection point, a color of the projection point, or a shape of the projection point. For example, a larger grayscale value of a projection point indicates a greater number of three-dimensional points on the object projected onto that projection point, or a darker color of a projection point indicates a greater number of three-dimensional points projected onto that projection point.

In some embodiments, the grayscale value of each projection point in the depth distribution image is positively correlated with the number of three-dimensional points of the object projected to that projection point. That is, a larger gray value of a projection point indicates a greater number of three-dimensional points projected to that projection point.

In some embodiments, as shown in FIG. 3, the height of the small rectangular body 32 is smaller in the Y-axis direction, while the height of the large rectangular body 33 is higher in the Y-axis direction. Thus, for the same position in the X-axis, the number of spatial three-dimensional points corresponding to the large rectangular body 33 is larger, and the number of spatial three-dimensional points corresponding to the small rectangular body 22 is smaller, so the brightness value of the projection points corresponding to the large rectangular body 33 can be set larger, indicating that each projection point corresponds to a larger number of three-dimensional points. Therefore, the brightness value of the projection points of the large rectangular body 33 can be set to a larger value, indicating that each projection point corresponds to a larger number of 3D points, and the brightness value of the projection points of the small rectangular body 32 can be set to a smaller value, indicating that it corresponds to a smaller number of 3D points.

In some embodiments, the distribution range of the projection points corresponding to each object in the horizontal axis direction of the depth distribution image is positively correlated with the size of each object. For example, the wider the distribution range of each object in the horizontal axis direction of the depth distribution image indicates the larger the size of the object in the corresponding axis direction. As shown in FIG. 3, compared with the small rectangular body 32, the large rectangular body 33 has a longer length in the X-axis direction, and thus the projected points corresponding to the large rectangular body 33 have a wider distribution range in the horizontal direction of the image on the depth distribution image obtained by projection along the Y-axis. Of course, if the depth distribution image is obtained by projection along the X-axis, using the horizontal axis of the depth distribution image to represent the depth value and the vertical axis to represent the distribution of the object corresponding to the projected points in the three-dimensional space, the small rectangular body 32 has a higher height in the Y-axis direction compared with the large rectangular body 33, and thus the projected points corresponding to the small rectangular body 32 have a wider distribution range in the direction of the vertical axis of the depth distribution image.

In some embodiments, the vertical axis of the depth distribution image can be used to represent the depth value, and the height of the projection points corresponding to each object in the direction of the vertical axis of the depth distribution image is positively correlated with the depth distance between each object and the photographing device, i.e., the lower the position of the projection points located in the direction of the vertical axis of the depth distribution image, the closer the object corresponding to the distance between the object and the photographing device. As shown in FIG. 3, compared with the small rectangular body 32, the large rectangular body 33 is farther away from the photographing device, and thus the projection point corresponding to the large rectangular body 33 is located at the top of the vertical axis of the depth distribution image along the Y axis.

In some embodiments, the scales of the vertical axis of the depth distribution image may be obtained by quantifying the depth values of the objects in the target scene. For example, the depth distribution range of each object in the target scene may be determined, and then the depth value of each object in the target scene may be quantified according to the height of the depth distribution image. Of course, in some embodiments, after quantifying the depth values according to the height of the depth distribution image, the quantified depth values may be the same for objects located at different depths.

Figure 4A:
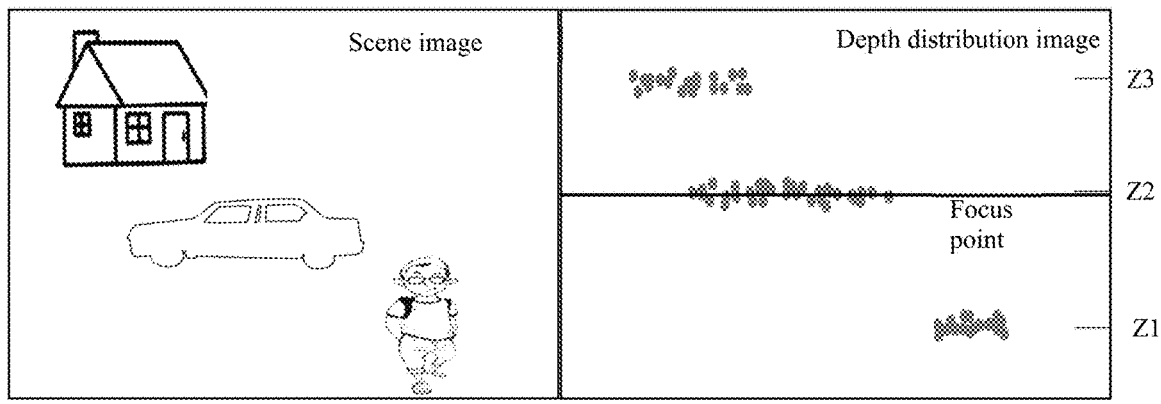
FIGS. 4(a)-4(c) are schematic diagrams showing focal positions by depth distribution images of some embodiments of the present application.
Figure 4B:
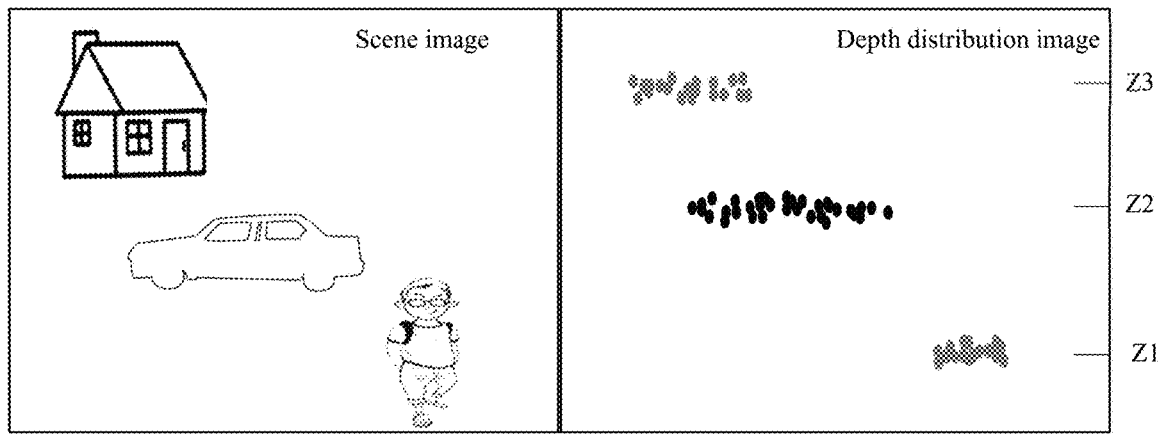
Figure 4C:
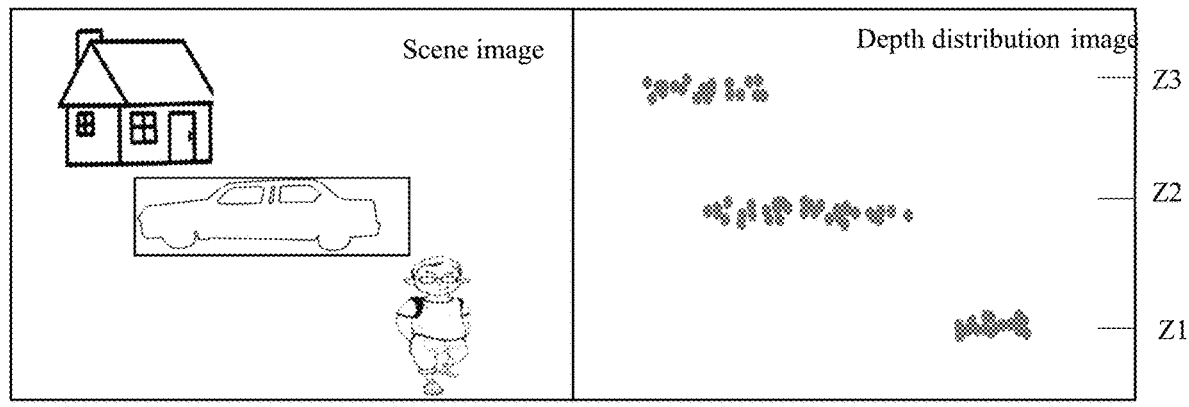

In some embodiments, the focus position of the photographing device corresponding to the focal point in the target scene may be demonstrated by the depth distribution image. Among them, there can be various ways of displaying the location of the focal point through the depth distribution image. For example, in some embodiments, the depth value corresponding to the focal point of the photographing device can be identified in the depth distribution image through a designated marker. For example, the depth value corresponding to the focal point can be marked on the depth distribution image, as shown in FIG. 4(a), and the location of the focal point can be indicated in the depth distribution image by a straight line pointing to the depth value corresponding to the focal point (as shown by the black line in the figure). Alternatively, the objects in the plane of the focal point can be identified on the depth distribution image, as shown in FIG. 4(b), and the projection points corresponding to the objects in the plane of the focal point can be marked with different colors (such as the black projection points in the figure), so that the location of the focal point can be determined. Of course, in some embodiments, the current position of the focal point can also be shown by the scene image. For example, the objects on the plane where the focal point is located can be identified in the scene image. As shown in FIG. 4(c), the object corresponding to the focal point (such as the object identified by the black box in the figure) can be displayed in the scene image, and by corresponding the scene image to the depth distribution image, the depth of the focal point location can be determined.

Figure 5:
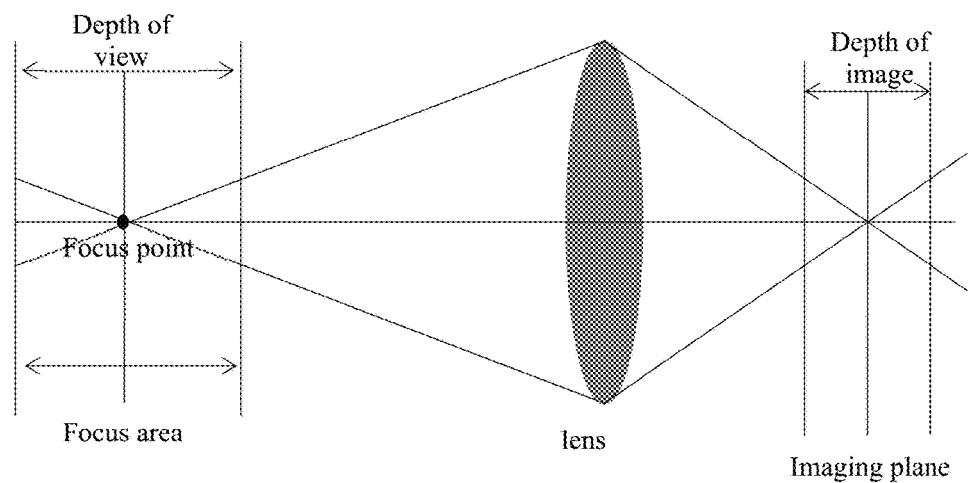
FIG. 5 is a schematic diagram of imaging principle of a lens of an embodiment of the present application.

In some embodiments, as shown in FIG. 5, after the photographing device is in focus, not only the image of the object on the plane where the focus point is located is clear in the photographing device, but also the images of objects within a certain distance before and after the focus point are also clear in the photographing device. The distance range is the depth of field of the photographing device. When the focus position of the photographing device is determined, objects within a certain distance before and after the focus point are clearly imaged in the photographing device, and we can call the area corresponding to the depth of field range the focus area.

In order to allow the user to intuitively know which objects in the current target scene in the photographing device are clearly imaged, in some embodiments, the depth distribution image can also show the current focus area of the photographing device. The focus area is the area within the depth of field of the photographing device. Objects located in the focus area are clearly imaged in the photographing device. By displaying the focus area in the depth distribution image, it is convenient for the user to adjust the focus position in order to adjust one or more objects of interest to the focus area.

Figure 6A:
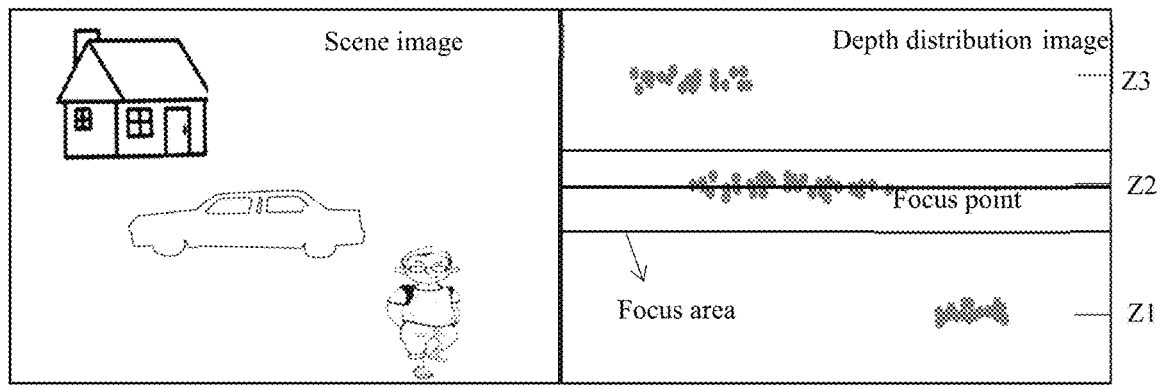
FIGS. 6(a)-6(b) are schematic diagrams showing focus areas by depth distribution images of some embodiments of the present application.

There can also be various ways to display the focus area in the depth distribution image. For example, in some embodiments, the depth range corresponding to the focus area can be marked in the depth distribution image, or a checkbox can be used to frame the focus area in the depth distribution image. As shown in FIG. 6(a), a checkbox can be used to frame the focus area in the depth distribution image, and objects located within the checkbox can be clearly imaged. In some embodiments, the projection points corresponding to the objects located in the focus area can also be identified in the depth distribution image, so that the user can determine which objects in the current target scene can be clearly imaged by combining the projection points identified in the depth distribution image and the scene image.

Figure 6B:
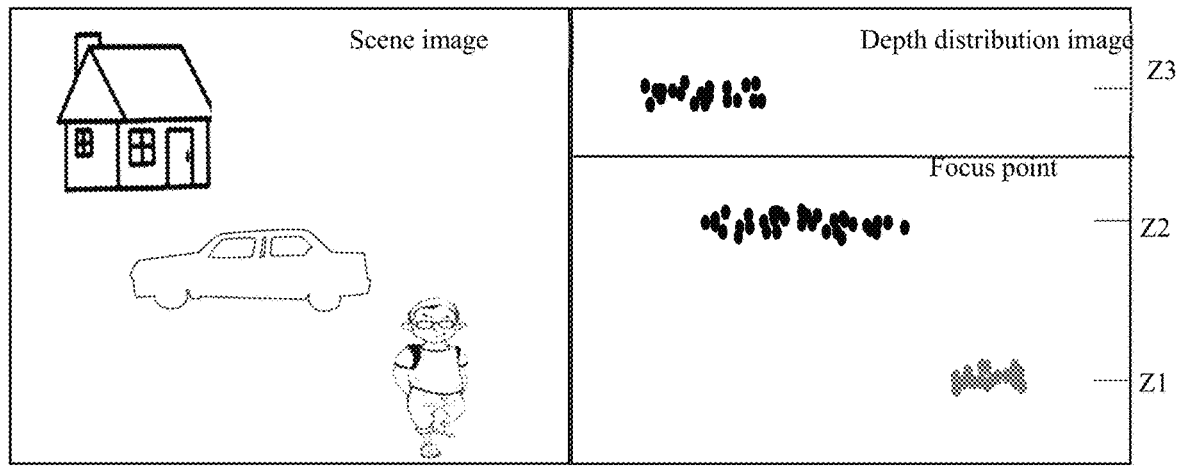

There can be various ways to identify the projection points corresponding to objects located in the focus area in the depth distribution image. For example, in some embodiments, the projection points corresponding to objects located in the focus area can be rendered in a specified color, (e.g., the black projection points in FIG. 6(b)). In some embodiments, the projection points corresponding to objects located in the focus area can also be marked with checkboxes, characters, or other. In some embodiments, checkboxes, characters or other markings can also be marked around the projection points corresponding to objects located in the focus area so that the user can identify these projection points.

Since the depth distribution image can show the focus position and focus area, in order to allow the user to visualize whether the target object of interest is currently located in the focus area, or whether the focus point is adjusted to the plane where the target object of interest is located, in some embodiments, one or more target objects of interest from the scene image captured by the photographing device can be identified to the user. Then, in the depth distribution image, the corresponding projection points of these target objects are identified. As such, the user will be able to clearly know whether the object of interest can be clearly imaged, and, if not clearly imaged, how to adjust the position of the focus.

In some embodiments, the user can select the target object of his or her interest by entering selection instruction in the interactive interface. For example, the user can frame or click one or more objects as the object of his or her interest in the scene image displayed in the interactive interface. In some embodiments, the target objects of interest to the user can also be automatically identified by the device performing the auxiliary focusing method. For example, specified types of objects such as faces, live bodies or objects with a percentage greater than a certain threshold in the scene can be automatically identified as objects of interest to the user, and then the projection points corresponding to these objects are identified in the depth distribution image.

In some embodiments, when generating the auxiliary focus image based on the scene image and the depth distribution image, the scene image and the depth distribution image can be stitched side-by-side to obtain the auxiliary focus image (as shown in FIG. 4(a)), where the stitching can be in the form of up-and-down stitching or the left-right stitching as long as the scene image of the target scene, the depth distribution of each object in the target scene, and the focus position of the photographing device can be displayed simultaneously in one image, and this application is not limited.

In some embodiments, the depth distribution image may be an image with some transparency, and the depth distribution image may be superimposed on the scene image to generate a secondary focus image. When generating the secondary focus image based on the scene image and the depth distribution image (e.g., FIGS. 7(a) and 7(b)), for example, the depth distribution image can be superimposed on the area with fewer objects in the scene image, so that the objects in the scene image are not obscured.

Figure 7A:
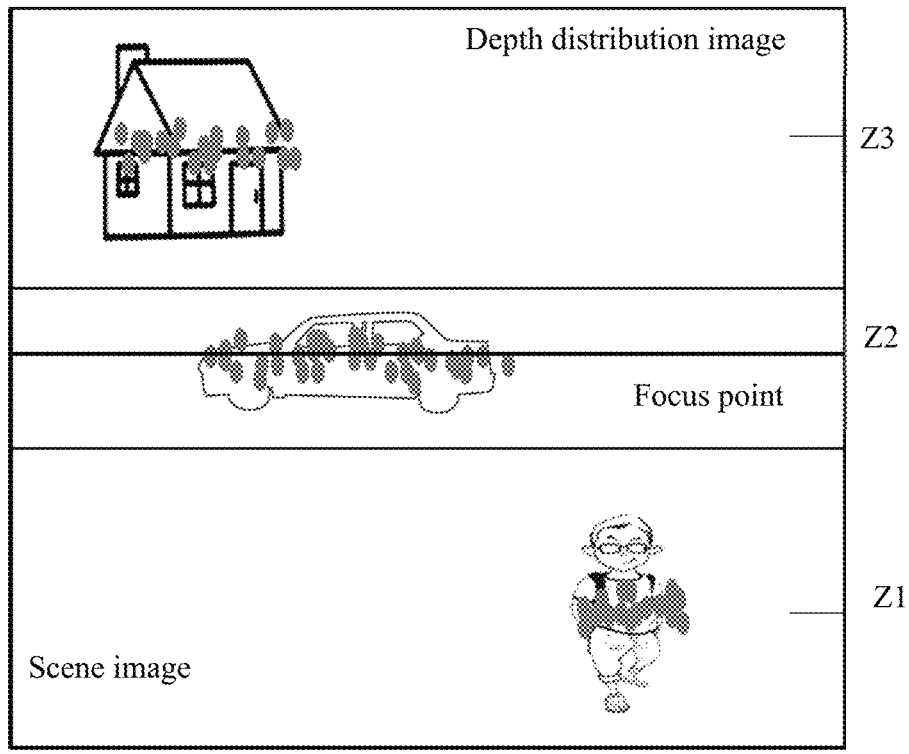
FIGS. 7(a)-7(b) are schematic diagrams of auxiliary focus images of some embodiments of the present application.
Figure 7B:
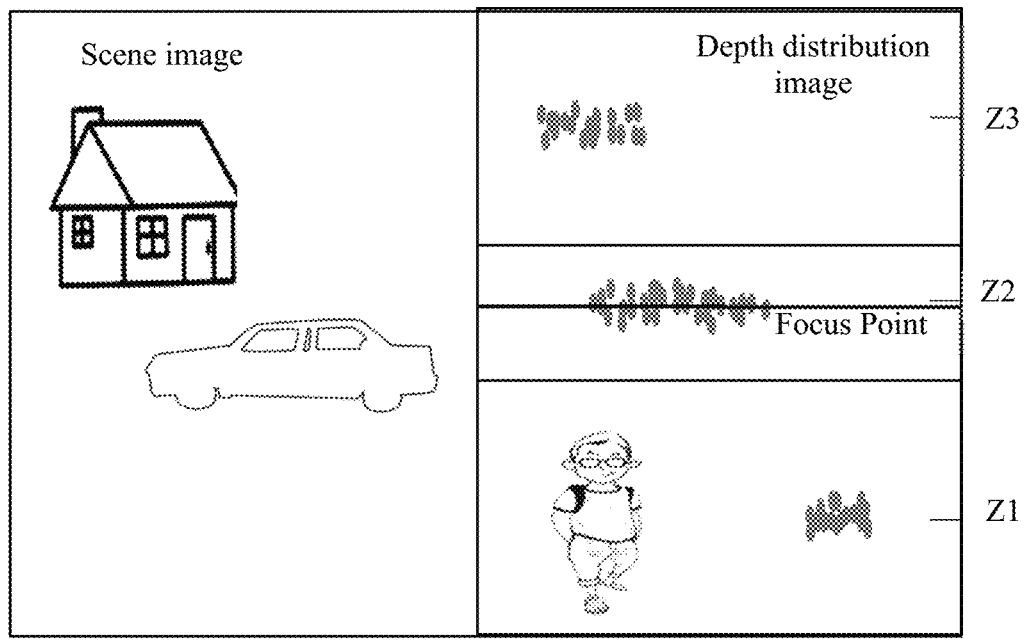

In some embodiments, the size of the depth distribution image can be the same as the size of the scene image (e.g., FIG. 7(a)). In some embodiments, the size of the depth distribution image can also be smaller than the size of the scene image (e.g., FIG. 7(b)). For example, in a scene where the depth distribution image is overlaid onto the scene image, the depth distribution image can be smaller than the size of the scene image, so that only a small portion of the scene image is overlapped to avoid obscuring the contents of the scene image.

Figure 8:
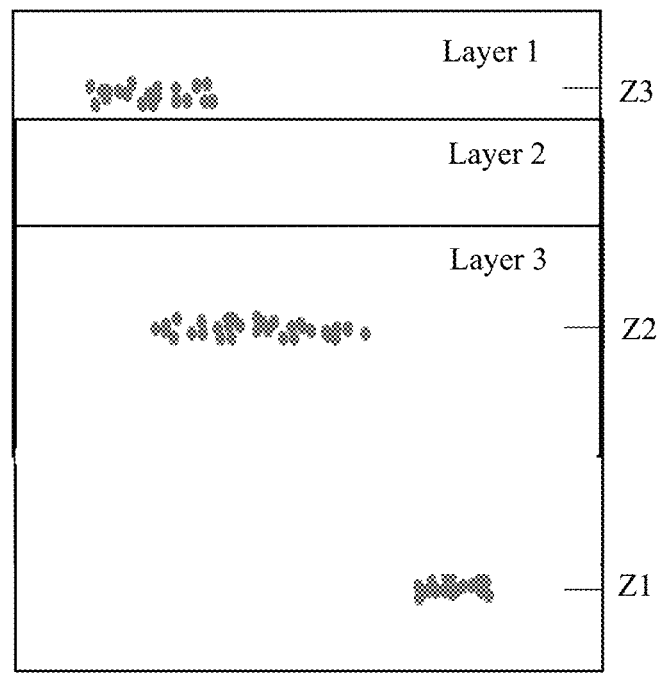
FIG. 8 is a schematic diagram of a depth distribution image including a plurality of layers of an embodiment of the present application.

In some embodiments, the depth distribution image may include only one layer, in which the projection points corresponding to all objects in the target scene are displayed in one layer. In some embodiments, in order to facilitate the user to distinguish different objects from the depth distribution image, the depth distribution image may also include multiple layers, each of which may display the projection points corresponding to one object (as shown in FIG. 8). In this way, the projection points of different objects can be located in different layers without stacking together, which is convenient for users to view. Of course, in some embodiments, it is also possible to display multiple projection points per layer for objects that are relatively close in depth distance.

In some embodiments, if a plurality of layers are used to display the projection points corresponding to each object in the target scene, the plurality of layers may be staggered. The arrangement sequence of the plurality of layers may be determined based on the degree of attention of the object corresponding to each image. For example, the layers corresponding to the objects that the user is more interested in can be arranged in the front, and the layers corresponding to the objects that the user is not interested in are arranged in the back.

Of course, since the depth distribution image shows the depth distribution of each object by means of projected points, it is not easy for the user to distinguish which object corresponds to the projected points by means of the depth image, and thus it can be determined in combination with the scene image. In some embodiments, in order to facilitate the user to associate the projection points in the depth distribution image with the objects in the target scene image, the target pixel points and the target projection points corresponding to the same object can be determined in the scene image and the depth distribution image respectively when generating the auxiliary focus image. The target pixel points and the target projection points corresponding to the same object can be displayed in the auxiliary focus image in association, so that the user can quickly identify the object corresponding to the projection point of the depth image in the scene image by the auxiliary focus image.

In some embodiments, when associating the display of target pixel points and target projection points corresponding to the same object, the target projection point and the target pixel point can be selected using the same color selection box. Of course, since the scene image is a color image, it is possible to render the color of the target projection point to the color of the target pixel point (i.e., the object), so that the pixel points and projection points of the same object can be associated according to the color. Of course, it is also possible to associate the target projection point with the target pixel point by marking the same character in the neighboring position of the target pixel point, and there are many ways to achieve this, as long as it is possible to associate the pixel points of the same object in the scene image and the projection points in the depth distribution image, and this application is not limited.

In some embodiments, the field of view corresponding to the scene image is the same as the field of view corresponding to the depth distribution image. For example, the depth distribution image can be generated based on the depth image captured by the depth camera. The photographing device and the depth camera can be fixed on the same gimbal at the same time, and both cameras rotate with the gimbal, and the field of views of the images captured by both changes simultaneously with the rotation of the gimbal. In this way the content displayed in the scene image and the content displayed in the depth distribution image both change as the gimbal rotates. In some implementations, the field of view corresponding to the scene image can be only a part of the field of view corresponding to the depth distribution image. For example, the field of view of the depth camera can be fixed, and what it acquires is the depth image of the entire target scene, while the photographing device only acquires the image of a part of the objects in the target scene. As such, in this way, the scene image will change when the viewing angle of the photographing device is moved, and the content displayed by the depth distribution image remains unchanged. In this way, when the object being photographed is a scene of moving objects, the depth distribution image can also be a good display of the movement of the object being photographed in the whole scene.

In some embodiments, the auxiliary focus image can be displayed only after the user turns on the auxiliary focus mode. For example, when the user does not turn on the auxiliary focus mode, the interactive interface only displays the scene image captured by the photographing device, so that the user can easily view the captured image. When the user's input command to turn on the auxiliary focus mode is received, the auxiliary focus image is displayed in the interactive interface, so that the user can easily adjust the focus position according to the auxiliary focus image. To further explain the auxiliary focus method provided by some embodiments of the present application, the following is explained in conjunction with a specific embodiment.

Figure 9:
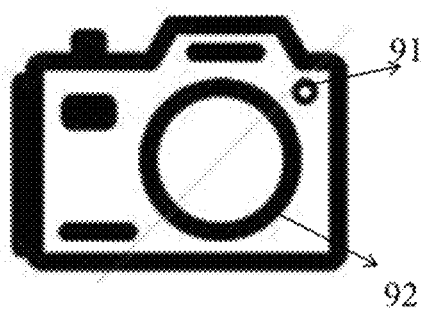
FIG. 9 is a schematic diagram of an application scenario of an embodiment of the present application.

As shown in FIG. 9, a schematic diagram of an application scenario of this application, the photographing device is an all-in-one device including a depth camera 91 and a color camera 92, and the relative positional parameters of the two cameras can be pre-calibrated. The photographing device also includes an interactive interface for real-time display of the scene image captured by the color camera. After the photographing device is activated, the color camera can capture a scene image of the scene and the depth camera can capture a depth image of the scene. The coordinate systems of the two images can then be unified according to the relative positional parameters of the two cameras, for example, both unified under the coordinate system of the color camera or both unified under the coordinate system of the depth camera.

After unifying the coordinate systems of the two images, the depth distribution image of each object in the scene can be generated based on the depth image. It is assumed that the Z-axis direction in the three-dimensional space is the depth direction, the X-axis direction is the same as the X-axis direction of the depth image, and the Y-axis direction is the same as the Y-axis direction of the depth image. The depth distribution image can be regarded as the image obtained by projecting each object in the scene along the Y-axis direction. Among them, the X-axis of the depth distribution image can correspond to the X-axis of the depth image, i.e., it indicates the location distribution of the object in the X-axis in the three-dimensional space. The larger the size of the object in the X-axis direction in the three-dimensional space, the larger the image in the X-axis direction of the depth distribution image.

The Y-axis of the depth distribution image can represent the depth of each object in the scene. The Y-axis of the depth distribution image may carry a scale, and each scale may identify a corresponding depth value. The scales may be uniformly distributed or non-uniformly distributed. When generating a depth distribution image based on the depth image, each column of the depth image can be traversed, and the depth distribution of the pixels in that column can be formed by plotting the depth value of each pixel in that column on the depth distribution image according to the scale of the Y-axis on the depth distribution image. Since the coordinates of the depth value and the Y-axis of the depth distribution image require scale conversion, the quantized depth value may be the same for pixels at different locations after quantizing the depth value by image height. When drawing a depth distribution image, the gray value of each pixel in the depth distribution image indicates the frequency of occurrence of the three-dimensional points of each object in that column and at that depth. The larger the brightness of the pixels on the depth distribution image, the more and denser the points at the depth of the column in the space.

Figure 10:
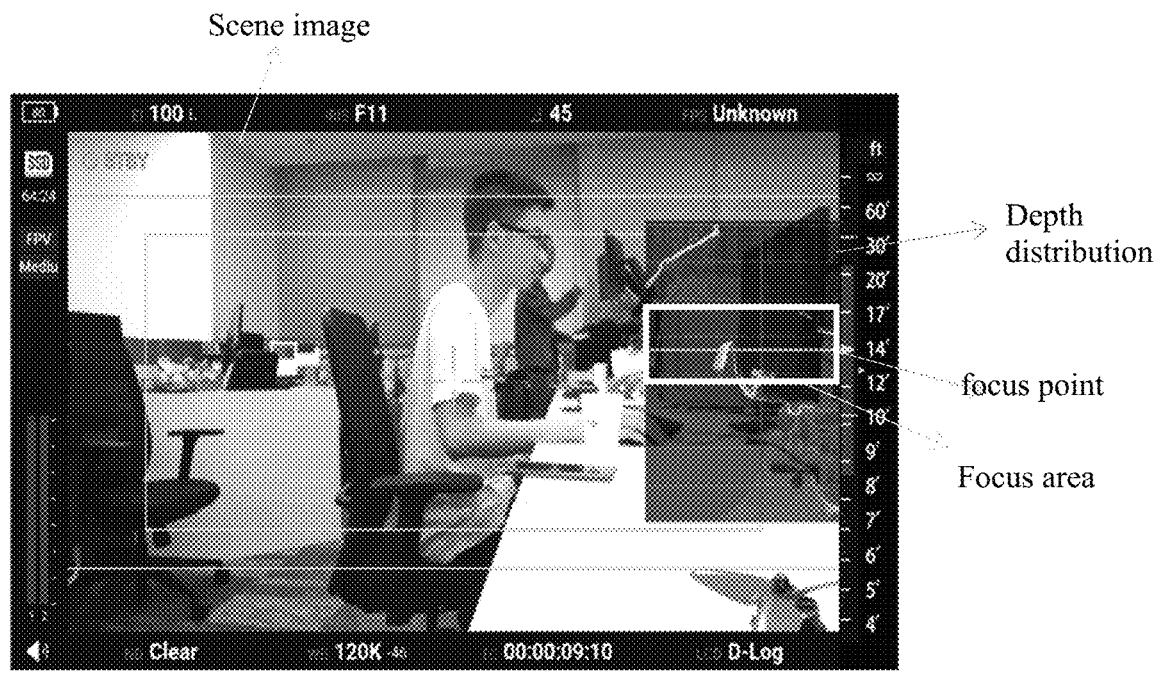
FIG. 10 is a schematic diagram of an auxiliary focus image of an embodiment of the present application.

After generating the depth distribution image, that is, the auxiliary focus image can be obtained from the depth distribution image and the scene image. Among them. The depth distribution image can be an image with a certain transparency, and the depth distribution image can be superimposed on the scene image to get the auxiliary focus image, and then the auxiliary focus image is displayed in the interactive interface of the photographing device. As shown in FIG. 10, the auxiliary focus image is generated based on the scene image captured by the color camera and the depth distribution image.

In order to let the user know the current focus position visually, it is also possible to mark the focus position on the depth distribution image. For example, the depth value pointed by the line with an arrow in FIG. 10 is the depth value corresponding to the focus position. Of course, the focus area can also be marked on the depth distribution image, for example, the focus area is framed in the depth distribution image, such as the area selected by the white marquee in FIG. 10. Alternatively, pixels corresponding to objects in the focus area in the depth distribution image may be rendered into a specified color.

The user can know the current focus position through the auxiliary focus image, and adjust the focus position according to the position of the object of interest. After the user adjusts the focus position, the auxiliary focus image will be updated again according to the focus position.

Of course, the user can set a control in the interactive interface of the photographing device, and the control is used to turn on or off the auxiliary focus mode. The interactive interface shows the auxiliary focus image when the auxiliary focus mode is started. When the auxiliary focus mode is turned off, the interactive interface only shows the scene image captured by the color camera.

With the auxiliary focusing method provided by some embodiments of this application, the user can intuitively know the depth distribution of each object in the scene, the location of the focal point and the focus area based on the auxiliary focus image, so that the position of the focal point can be adjusted so that the object of interest is located in the focus area. As such, the object of interest can be clearly imaged. By this method, it can facilitate the user to focus and improve the focusing efficiency.

Figure 11:
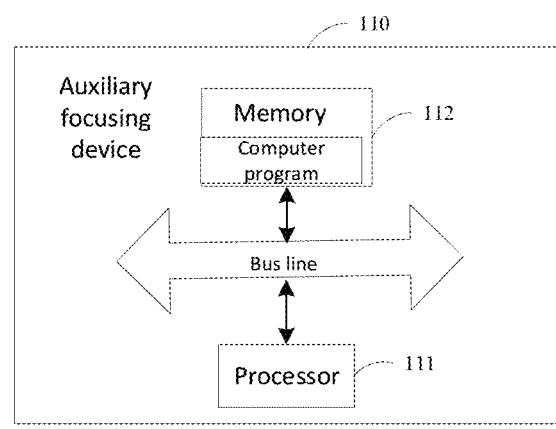
FIG. 11 is a schematic diagram of a logical structure of an auxiliary focusing device of an embodiment of the present application.

Accordingly, one embodiment of the present application also provides an auxiliary focus device. As shown in FIG. 11, the auxiliary focus device 110 comprises a processor 111, a memory 112, a computer program stored on the memory 112 for execution by the processor 111, the processor 111 executing the computer program realizing the following steps:
   in the case where the photographing device is photographing the target scene, generating an auxiliary focus image based on the depth information of each object in the target scene, the auxiliary focus image being used to demonstrate the depth distribution of the objects and the current position of the focus point of the photographing device in the target scene;
   presenting the auxiliary focus image to the user via an interactive interface; and
   receiving the user's adjustment of the position of the focus point, and updating the auxiliary focus image according to the adjusted position of the focus point.

In some embodiments, the processor, when used to generate an auxiliary focus image based on the depth information of each object in the target scene, is specifically used to:
   acquire a scene image of the target scene captured by the photographing device;
   generate a depth distribution image based on depth information of objects in the target scene, the depth distribution image being used to display the depth distribution of the objects; and
   generate the auxiliary focus image based on the scene image and the depth distribution image.

In some embodiments, the depth distribution of the objects is shown by the projection points corresponding to the objects in the depth distribution image, the projection points being obtained by projecting the objects along a specified axial direction, the specified axial direction not coinciding with the axial direction of the optical axis of the photographing device.

In some embodiments, the horizontal or vertical axis of the depth distribution image is used to display the depth of the projected points.

In some embodiments, the depth distribution image carries scales on the horizontal or vertical axis, each scale identifying a corresponding depth value.

In some embodiments, the scale is a non-uniform scale.

In some embodiments, the vertical axis of the depth distribution image represents the depth value of the projection points, the horizontal axis of the depth distribution image represents the location distribution in space of the objects corresponding to the projection points, and the properties of the projection points are used to characterize the number of spatial three-dimensional points corresponding to the objects projected to the projection points.

In some embodiments, the properties of the projection point include any of the following: a gray value of the projection point, a color of the projection point, or a shape of the projection point.

In some embodiments, the grayscale value of the projection point is positively correlated with the number of spatial three-dimensional points corresponding to the objects projected to the projection point.

In some embodiments, the distribution range of the projection points corresponding to the object in the direction of the horizontal axis of the depth distribution image is positively correlated with the size of the object.

In some embodiments, the height of the position of the distribution of the projection point corresponding to the object in the direction of the longitudinal axis of the depth distribution image is positively correlated with the distance of the object from the photographing device.

In some embodiments, the scale of the vertical axis of the depth distribution image is obtained by quantifying the depth values of the objects.

In some embodiments, the position of the photographing device's focus point in the scene corresponding to the depth distribution image is shown.

In some embodiments, the processor, when used to display the position of the focus point of the photographing device in the depth distribution image in the scene, is specifically used to:
   identify the corresponding depth of the focus point of the photographing device in the depth image by specifying an identifier.

In some embodiments, the depth distribution image is further used to display a focus area of the photographing device, wherein an object located in the focus area is clearly imaged in the photographing device.

In some embodiments, the processor, when the depth distribution image displays the focus area of the photographing device, is specifically used to:
   frame the focus area in the depth distribution image; or
   identify in the depth distribution image the projection points corresponding to the objects located in the focus area.

In some embodiments, the processor, when used to identify in the depth distribution image the projection points corresponding to the object located within the focus area, is specifically used to:

render the projection points corresponding to the objects within the focus area in the depth distribution image to a specified color.

In some embodiments, the processor is further used to:
determine the target object of interest to the user from the scene image; and
identify in the depth distribution image the projection points corresponding to the target object.

In some embodiments, the processor, when used to determine a target object of interest to the user from the scene image, is specifically used to:
determine a target object of interest to the user from the scene image based on selection instructions entered by the user through the interactive interface; or
identify the specified type of object from the scene image as the target object.

In some embodiments, the depth distribution image comprises a plurality of layers, each layer being used to display the depth distribution of the projection points corresponding to one object.

In some embodiments, the plurality of layers are staggered, and the arrangement order of the plurality of layers is determined based on the degree of attention of the objects corresponding to the layers.

In some embodiments, the processor is further used to:
determine a target pixel point in the scene image and a target projection point in the depth distribution image corresponding to the same object; and
display the target pixel point and the target projection point in association in the auxiliary focus image.

In some embodiments, the processor, for use in associating the display of the target pixel point and the target projection point in the auxiliary focus image, is specifically used to:
use a selection box of the same color to frame the target pixel point as well as the target projection point; or
render the color of the target projection point to the color corresponding to the target pixel point; or
mark a same character at the target projection point and at a location adjacent to the target pixel point.

In some embodiments, the depth distribution image is an image with a certain transparency, and the processor used to generate the auxiliary focus image based on the scene image and the depth distribution image is specifically used to:
overlay the depth distribution image on top of the scene image to generate the auxiliary focus image.

in some embodiments, the dimensions of the depth distribution image are the same as the dimensions of the scene image; or
the depth distribution image has a smaller size than the scene image.

In some embodiments, the processor, when used to generate the auxiliary focus image based on the scene image and the depth distribution image, is specifically used to:
stitch the depth distribution image side-by-side with the scene image to generate the auxiliary focus image.

In some embodiments, the scene image corresponds to the same viewing angle range as the depth distribution image; or
the viewing angle range corresponding to the scene image is a portion of the viewing angle range corresponding to the depth distribution image.

In some embodiments, the processor, before displaying the auxiliary focus image to the user, is also used to:
receive a user input command, wherein the command is used to indicate that the auxiliary focus mode is on.

Further, one embodiment of the present application provides an auxiliary focus system including the auxiliary focus device, the photographing device, and the distance measuring device mentioned in the above embodiments.

In some embodiments, the auxiliary focusing system further includes a gimbal, the photographing device and the distance measuring device fixed to the gimbal.

Accordingly, some embodiments of the present specification further provide a computer storage medium, the storage medium having a program stored therein, the program when executed by a processor implementing the auxiliary focusing method of any of the above embodiments.

Some embodiments of this application may take the form of a computer program product implemented on one or more storage media (including, but not limited to, disk memory, CD-ROM, optical memory, etc.) that contain program code therein. Computer-available storage media include permanent and non-permanent, removable and non-removable media, and may be implemented by any method or technique for storing information. Information may be computer-readable instructions, data structures, modules of a program, or other data. Examples of storage media for computers include, but are not limited to: phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc only Read Memory (CD-ROM), Digital Versatile Disc (DVD) or other optical storage, magnetic cartridge tape, magnetic tape magnetic disk storage or other magnetic storage device or any other non-transport medium that can be used to store information that can be accessed by computing devices.

For the device embodiment, since it corresponds essentially to the method embodiment, it is sufficient to refer, where relevant, to the partial description of the method embodiment. The device embodiments described above are merely schematic, where the units described as separate components may or may not be physically separated, and the components displayed as units may or may not be physical units, i.e., they may be located in one place or may be distributed to multiple network units. Some or all of these modules can be selected according to practical needs to achieve the purpose of this embodiment solution. It can be understood and implemented by a person of ordinary skill in the art without creative work.

It is noted that in this document, relationship terms such as first and second are used only to distinguish one entity or operation from another, without necessarily requiring or implying any such actual relationship or order between those entities or operations. The term "includes," "comprises," or any other variation thereof, is intended to cover non-exclusive inclusion so that a process, method, article, or apparatus that includes a set of elements includes not only those elements, but also other elements not explicitly listed, or also includes the process, method, article, or apparatus for which such process, method, article, or apparatus is intended, or also include elements that are inherent to such process, method, article, or apparatus. Without further limitation, the inclusion of an element as defined by the statement "including a" does not preclude the existence of additional identical elements in the process, method, article, or apparatus including the element.

The method and device provided by some embodiments of the present application are described in detail above, and specific examples are applied in this paper to elaborate the principle and implementation of the present application. The above description of the embodiments is only used to help understand the method of the present application and its core idea. At the same time, for those skilled in the art, according to the idea of the present application, there will be changes in the specific implementation and application scope. In summary, the contents of this specification should not be construed as limiting the present application.

The above mentioned is only a specific implementation of the present application, but the scope of protection of the present application is not limited to this, and any person skilled in the art can easily think of various equivalent modifications or substitutions within the technical scope disclosed in the present application, which should be covered by the scope of protection of the present application. Therefore, the scope of protection of this application shall be subject to the scope of protection of the claims.

What is claimed is:

1. An auxiliary focusing method, comprising:
under a condition that an image capturer photographs a target scene, generating an auxiliary focus image based on depth information of objects in the target scene, wherein the auxiliary focus image displays a current position of a focus point of the image capturer in the target scene and a plurality of projection points, the plurality of projection points includes one or more first projection points each representing at least one spatial three-dimensional point of a first object of the objects in the target scene, and one or more second projection points each representing at least one spatial three-dimensional point of a second object of the objects in the target scene, and distances of the plurality of projection points to a side of the auxiliary focus image are positively correlated to distances of corresponding the at least one spatial three-dimensional point of the first object and the at least one spatial three-dimensional point of the second object to the image capturer;
displaying the auxiliary focus image to a user via an interactive interface;
receiving adjustment of the current position of the focus point by the user to obtain an adjusted position of the focus point; and
updating the auxiliary focus image based on the adjusted position of the focus point.

2. The method according to claim 1, wherein generating the auxiliary focus image based on depth information of the objects in the target scene comprises:
acquiring a scene image of the target scene captured by the image capturer;
generating a depth distribution image based on the depth information of the objects in the target scene, the depth distribution image displaying the plurality of projection points; and
generating the auxiliary focus image based on the scene image and the depth distribution image.

3. The method according to claim 2, wherein the plurality of projection points are obtained by projecting the objects along a specified axial direction, the specified axial direction does not coincide with an axial direction of an optical axis of the image capturer, and a horizontal or vertical axis of the depth distribution image displays depth values of the plurality of projection points.

4. The method according to claim 3, wherein the depth distribution image carries scales on the horizontal or vertical axis, each of the scales identifying a corresponding depth value, and the scales are non-uniform scales.

5. The method according to claim 4, wherein the vertical axis of the depth distribution image represents the depth values of the plurality of projection points, the horizontal axis of the depth distribution image represents location distribution in space of the objects corresponding to the plurality of projection points, and property of a projection point among the projection points characterize a number of the at least one spatial three-dimensional point corresponding to the objects projected to the projection point.

6. The method according to claim 5, wherein;
the property of the projection point includes at least one of the following: a gray value of the projection point, a color of the projection point or a shape of the projection point, and the gray value of the projection point is positively correlated with the number of spatial three-dimensional points corresponding to the objects projected to the projection point; or
a distribution range of one or more of the plurality of projection points corresponding to an object in a direction of the vertical axis of the depth distribution image is positively correlated with a size of the object; or
a distribution height of positions of the one or more of the plurality of projection points corresponding to the object in the direction of the horizontal axis of the depth distribution image is positively correlated with the distance of the object from the image capturer.

7. The method according to claim 2, wherein the position of the focus point of the image capturer in the target scene is displayed in the depth distribution image, and
displaying in the depth distribution image the position of the focus point of the image capturer in the target scene comprises:
identifying a corresponding depth value of the focus point of the image capturer in the depth distribution image by a specifying mark.

8. The method according to claim 2, further comprising:
displaying a focus area of the image capturer in the depth distribution image, including:
framing the focus area in the depth distribution image; or
identifying in the depth distribution image one or more of the plurality of projection points corresponding to the objects located within the focus area;
wherein the objects located in the focus area are clearly imaged in the image capturer.

9. The method according to claim 8, wherein identifying in the depth distribution image the one or more of the plurality of projection points corresponding to the objects located within the focus area comprises:
rendering the one or more of the plurality of projection points corresponding to the objects within the focus area in the depth distribution image to a specified color.

10. The method according to claim 2, further comprising:
determining a target object of interest to the user from the scene image; and
identifying in the depth distribution image one or more of the plurality of projection points corresponding to the target object;
wherein determining the target object of interest to the user from the scene image comprises:
determining the target object of interest to the user from the scene image based on selection instructions entered by the user through the interactive interface; or
identifying a specified type of object from the scene image as the target object.

11. The method according to claim 2, wherein:
the depth distribution image comprises a plurality of layers, and each of the plurality of layers displays depth distribution of one or more of the plurality of projection points corresponding to one of the objects; or the scene image corresponds to the same field of view as the depth distribution image, or a field of view corresponding to the scene image is a portion of a field of view corresponding to the depth distribution image.

12. The method according to claim 2, further comprising:
determining target pixel points in the scene image and target projection points in the depth distribution image corresponding to a same object, and
displaying the target pixel points and the target projection points in association in the auxiliary focus image;
wherein displaying the target pixel points and the target projection points in association in the auxiliary focus image comprises:
using a selection box of a same color to frame the target pixel points as well as the target projection points; or
rendering a color of the target projection points to a color corresponding to the target pixel points; or
marking the same character at a location adjacent to the target projection points and at a location adjacent to the target pixel points respectively.

13. The method according to claim 2, wherein the depth distribution image is an image with a certain degree of transparency, generating the auxiliary focus image based on the scene image and the depth distribution image comprises:
overlaying the depth distribution image on top of the scene image to generate the auxiliary focus image, wherein dimensions of the depth distribution image are the same as dimensions of the scene image or the depth distribution image has a smaller size than the scene image.

14. The method according to claim 2, wherein generating the auxiliary focus image based on the scene image and the depth distribution image comprises:
stitching the depth distribution image side-by-side with the scene image to generate the auxiliary focus image.

15. The method according to claim 1, wherein the auxiliary focus image comprises a scene image of the target scene and a depth distribution image of the target scene, and each of the scene image of the target scene and the depth distribution image includes the objects in the target scene.

16. The method according to claim 1, wherein generating the auxiliary focus image based on the depth information of the objects in the target scene includes:
acquiring a scene image of the target scene captured by the image capturer;
generating a depth distribution image based on the depth information of the objects in the target scene, the depth distribution image displaying the plurality of projection points, a vertical axis of the depth distribution image representing depth values of projection points, a horizontal axis of the depth distribution image representing location distribution in space of the objects corresponding to the projection points, property of each of the projection points indicating a number of spatial three-dimensional points corresponding to the objects projected to the each of the projection points, and the projection points being obtained by projecting the objects along a specified axial direction; and
generating the auxiliary focus image based on the scene image and the depth distribution image.

17. The method according to claim 1, wherein generating the auxiliary focus image based on the depth information of the objects in the target scene includes:
acquiring a scene image of the target scene captured by the image capturer;
generating a depth distribution image based on the depth information of the objects in the target scene, the depth distribution image displaying the plurality of projection points and a focus area of the image capturer, and the focus area of the image capturer being framed in the depth distribution image; and
generating the auxiliary focus image based on the scene image and the depth distribution image.

18. An auxiliary focusing device, comprising a processor, a memory, a computer program stored on the memory for execution by the processor, the processor executing the computer program to perform steps of:
under a condition that an image capturer photographs a target scene, generating an auxiliary focus image based on depth information of objects in the target scene, wherein the auxiliary focus image displays a current position of a focus point of the image capturer in the target scene and a plurality of projection points, the plurality of projection points includes one or more first projection points each representing at least one spatial three-dimensional point of a first object of the objects in the target scene, and one or more second projection points each representing at least one spatial three-dimensional point of a second object of the objects in the target scene, and distances of the plurality of projection points to a side of the auxiliary focus image are positively correlated to distances of corresponding the at least one spatial three-dimensional point of the first object and the at least one spatial three-dimensional point of the second object to the image capturer;
displaying the auxiliary focus image to a user via an interactive interface;
receiving adjustment of the current position of the focus point by the user to obtain an adjusted position of the focus point; and
updating the auxiliary focus image according to the adjusted position of the focus point.

19. An auxiliary focusing system, comprising the auxiliary focusing device of claim 18, the image capturer, and a distance measurer.

20. An auxiliary focusing method, comprising:
under a condition that an image capturer photographs a target scene, generating an auxiliary focus image based on depth information of objects in the target scene, wherein the auxiliary focus image displays a current position of a focus point of the image capturer in the target scene and a plurality of projection points each representing at least one spatial three-dimensional point of the objects in the target scene, and property of a projection point among the plurality of projection points characterize a number of the at least one spatial three-dimensional point corresponding to the objects projected to the projection point;
displaying the auxiliary focus image to a user via an interactive interface;
receiving adjustment of the current position of the focus point by the user to obtain an adjusted position of the focus point; and
updating the auxiliary focus image based on the adjusted position of the focus point.

* * * * *